Oct. 29, 1946.    L. S. WILLIAMS    2,410,139
WEIGHING SCALE
Filed Feb. 24, 1944    5 Sheets-Sheet 2
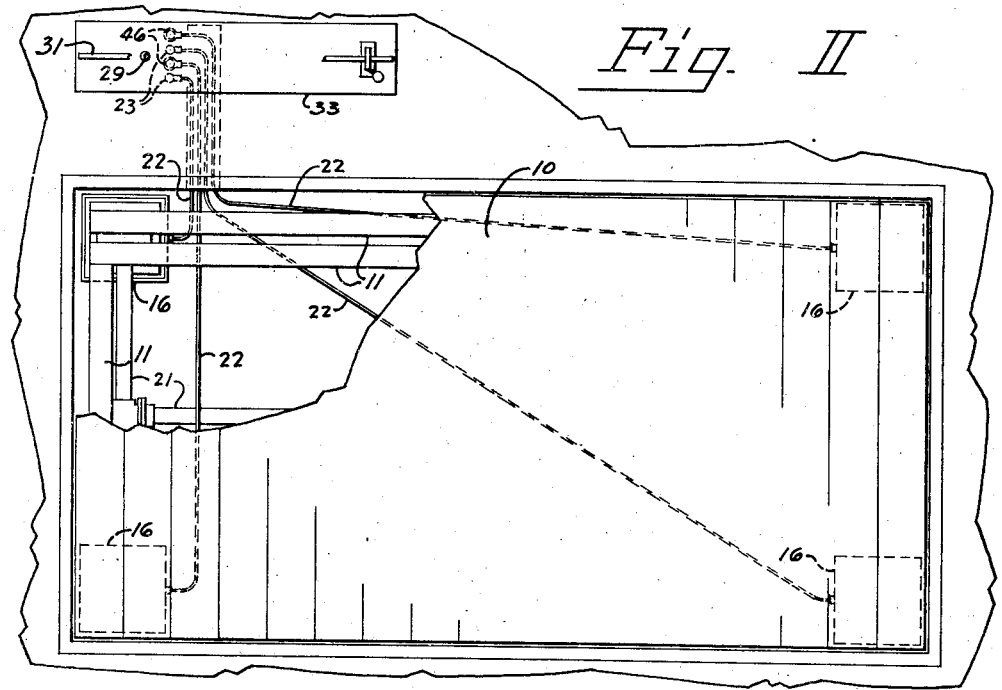
Fig. II
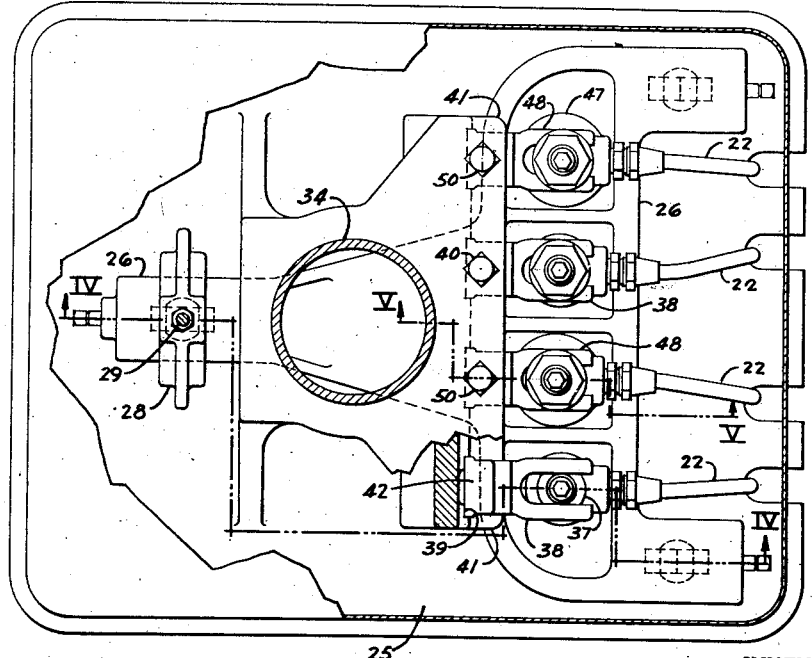
Fig. III
INVENTOR.
Lawrence S. Williams
BY
Marshall & Marshall
ATTORNEYS

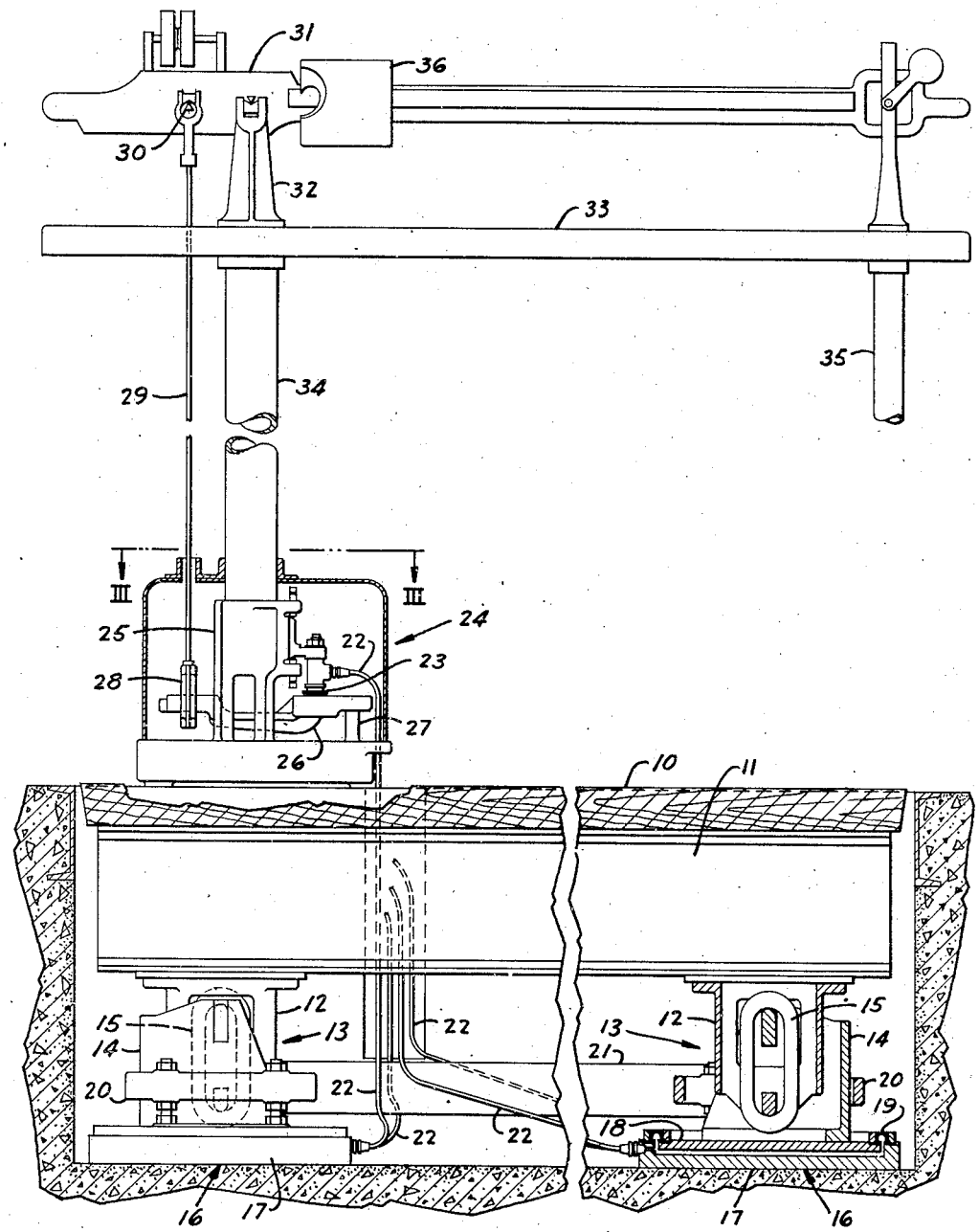
Fig. I

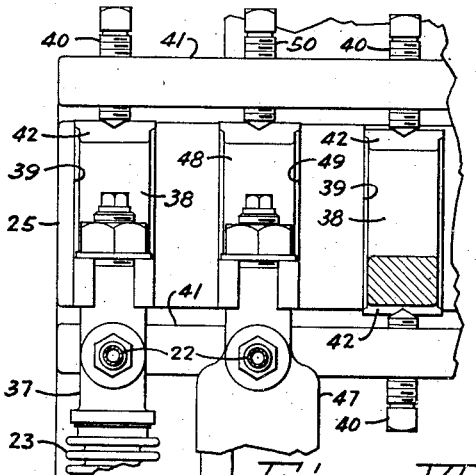
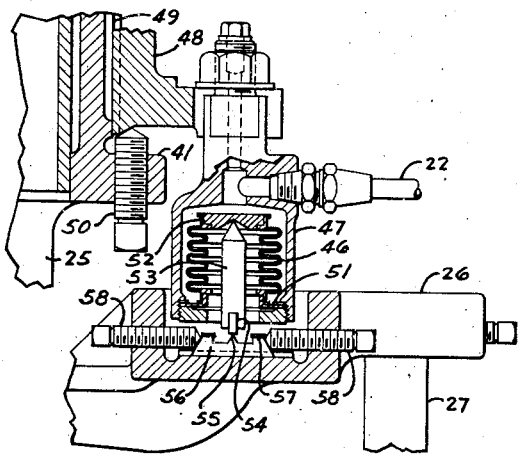
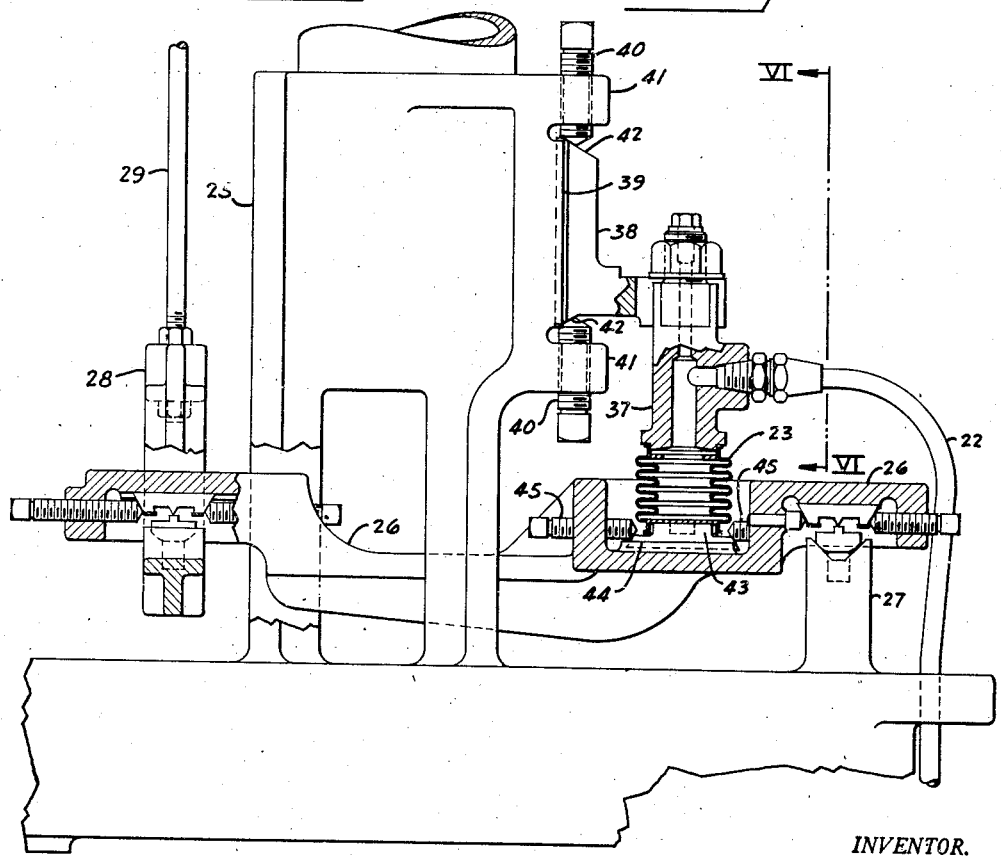

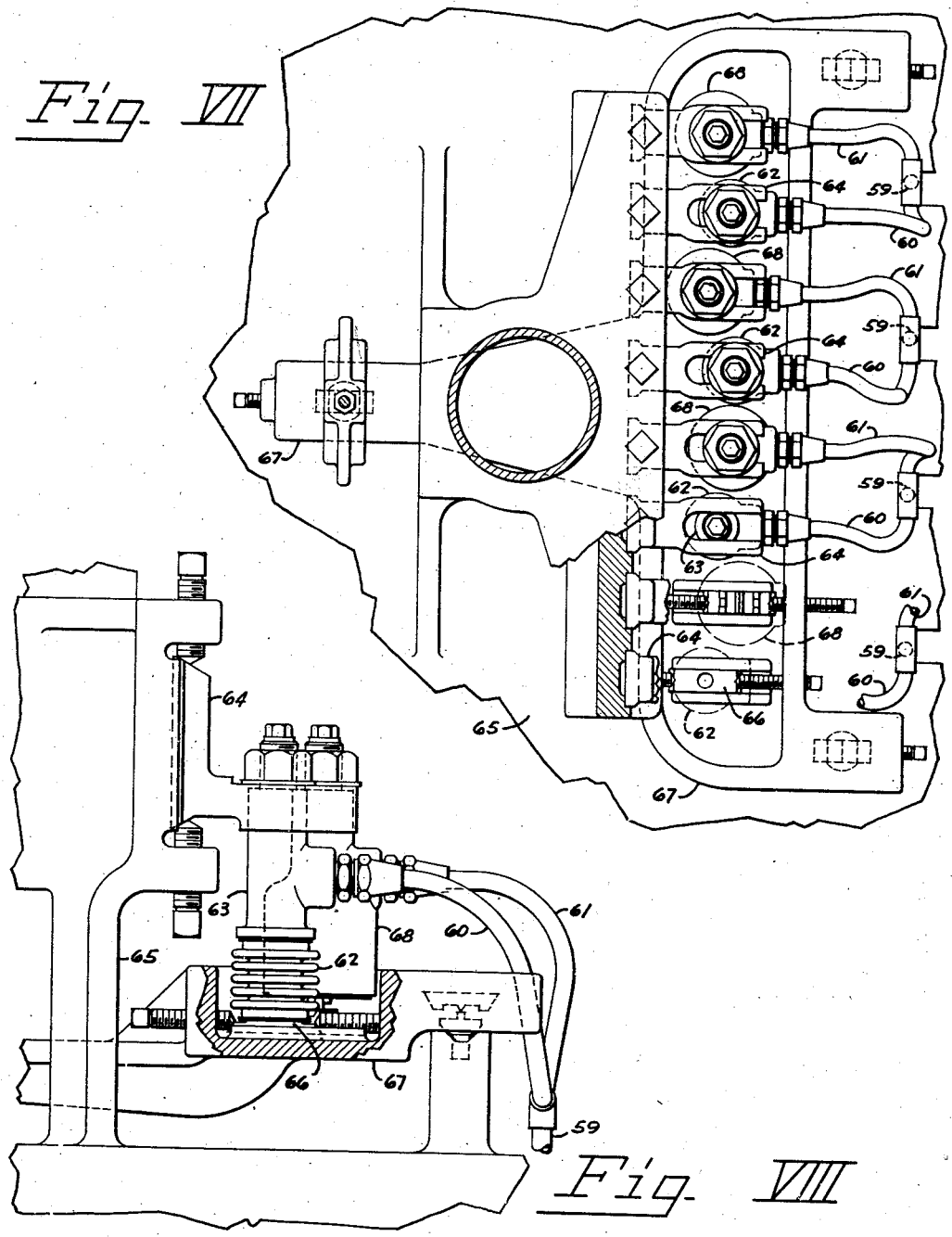

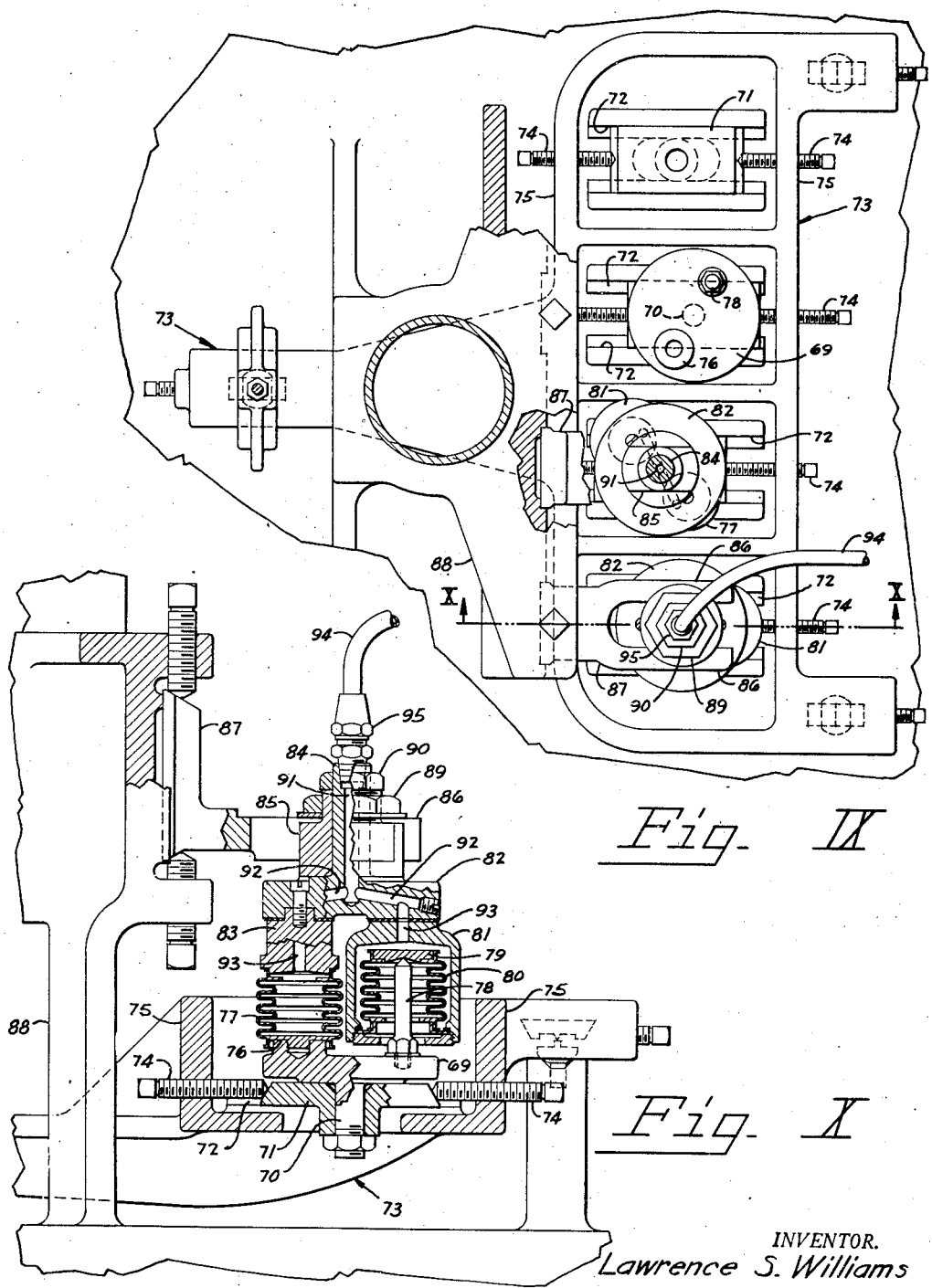
Fig. IX
Fig. X

Patented Oct. 29, 1946

2,410,139

UNITED STATES PATENT OFFICE 2,410,139

WEIGHING SCALE

Lawrence S. Williams, Toledo, Ohio, assignor to Toledo Scale Company, Toledo, Ohio, a corporation of New Jersey Application February 24, 1944, Serial No. 523,670

8 Claims. (Cl. 265—47)

There have been many attempts to build weighing scales incorporating a hydraulic force transmitting system between the load receiver and the counterbalancing mechanism. These hydraulic systems are advantageous in that they permit a shallower pit construction and eliminate the heavy lever system ordinarily used to support the load receiver.

The hydraulic force transmission systems comprise pressure transmitting capsules adapted to support the load receiver and to transform the mechanical forces applied to them into equivalent hydraulic pressures, and pressure receiving bellows adapted to transform the hydraulic pressures into mechanical forces which may be counterbalanced and indicated by a conventional weigh beam or similar weighing equipment. By making the effective area of the capsules large in comparison with the effective area of the bellows a relatively large force multiplication is obtained, i. e. a comparatively small force applied to the bellows can counterbalance a relatively heavy load.

In order that a hydraulic force transmitting system shall operate satisfactorily in a weighing scale it is necessary that the effective areas of the capsules and bellows remain constant independently of the force being transmitted. This is true because the effective areas determine the ratio of the hydraulic pressure to the force at each end of the system and as the hydraulic pressure is equal throughout the system the ratio of effective areas is the force transmission ratio.

It has been found possible to construct a pressure transmitting capsule whose area remains constant within the required tolerance. However, commercially obtainable bellows do not maintain an exactly constant effective area and their change in area with load produces appreciable error in the scale indication.

The object of this invention is to provide a hydraulic force transmission system in which the error due to changes in bellows area is minimized or completely eliminated.

Another object of this invention is to reduce the error in indication of a hydraulic scale by connecting some of the load supporting capsules to internally stressed bellows and the remainder of the capsules to externally stressed bellows.

Another object of the invention is to reduce the error due to effective change in bellows area by connecting an internally stressed bellows and an externally stressed bellows, in parallel, to each load supporting capsule.

Another object is to provide a mounting for an internally and an externally stressed bellows connected to a load supporting capsule which will allow their relative effects to be varied without disturbing their combined effect.

A still further object is to provide a mounting arrangement for the pressure receiver of a hydraulic scale which will permit each pressure receiver and its associated capsule to be removed or installed as a unit without disconnecting the hydraulic connection between them.

More specific objects and advantages are apparent from the description, in which reference is had to the accompanying drawings illustrating forms of hydraulic force transmitting systems embodying the invention.

In the drawings:

Figure I is an elevation, partly in section, of a weighing scale incorporating hydraulic force transmitting elements.

Figure II is a plan view of the weighing scale, with parts broken away to show its construction.

Figure III is an enlarged plan of the hydraulic pressure receiving system and gathering lever taken substantially along the line III—III of Figure I.

Figure IV is an enlarged elevation of the pressure receiving system taken along the line IV—IV of Figure III.

Figure V is a fragmentary end elevation of another of the pressure receiving elements taken substantially along the line V—V of Figure III.

Figure VI is a fragmentary end elevation of the pressure receiving systems viewed from the line VI—VI of Figure IV.

Figure VII is a plan view, with parts broken away, of an alternative form of pressure receiving and force combining system.

Figure VIII is an elevation, partly in section, of the pressure receiving system shown in Figure VII.

Figure IX is a plan, partly in section, with some parts omitted, showing another arrangement of pressure receiving elements.

Figure X is an elevation, partly in section, taken along the line X—X of Figure IX.

These specific drawings and the accompanying description is intended to merely illustrate and disclose the invention and not to impose limitations on the claims.

A load receiving platform 10 is supported on girders 11 which at their ends are carried on depending brackets 12. The brackets 12 are part of single link suspensions 13 which also include stands 14 and connecting links 15. The stands 14 are supported on hydraulic capsules 16, each of which has a base member 17 containing a shallow fluid containing recess in which a load supporting member 18 is fitted and hydraulically supported. The fluid is retained by a flexible membrane 19 which seals the space between the base member 17 and the load supporting member 18. Stabilizing rings 20 secured to the stands 14 or to the load supporting members 18 are interconnected by an "H" shaped pipe framework 21 to prevent any tipping of the load supporting members 18 in the capsules 16. The space between the members 17 and 18 of the capsules 16 containing the hydraulic fluid communicates through tubes 22 with bellows 23 of a pressure receiving system 24. The force created by the hydraulic pressure in the bellows 23 acts between a base 25 and a gathering lever 26 which is pivotally supported on fulcrum stands 27 erected from a flat lower portion of the base 25. The force from the lever 26 is transmitted through a stirrup 28, a steelyard rod 29, to a load pivot 30 of a weigh beam 31. The weigh beam 31 is pivotally supported on a fulcrum stand 32 erected on a weigh beam shelf 33 which in turn is supported on columns 34 and 35. A poise 36 slidably mounted on the weigh beam 31 is adapted to counterbalance the loads applied to the load receiving platform 10.

The bellows 23 may be internally stressed by applying the hydraulic pressure created in the capsules 16 to its interior as is indicated in Figure IV. The upper mounting for the bellows 23 comprises a connector 37 which is adapted to mechanically support the bellows and hydraulically connect it to one of the tubes 22 which leads to one of the capsules 16. The connector 37 is adjusted and locked between arms of a bracket 38 which in turn is vertically adjustable in ways 39 of the base 25. Adjusting screws 40 threaded through horizontal flanges 41 at the ends of the ways 39 engage sloped faces 42 of the bracket 38 to provide for its vertical adjustment and locking.

The lower end of the bellows 23 is attached to a force transmitting block 43 resting in horizontal ways 44 of the lever 26. The force transmitting block 43 is adjusted in the lever 26 to correct the force transmission ratio and is held in position by locking screws 45 threaded through vertical flanges in the lever 26 at the ends of the ways 44. The hydraulic scale of Figure I incorporates two such internally stressed bellows 23 connected to capsules located under diagonally opposite corners of the load receiving platform 10.

Bellows may also be externally stressed by applying the hydraulic pressure to the outside of a bellows enclosed in a surrounding cup-shaped housing. In this arrangement a bellows 46 (Figure V) is located in a cup-shaped housing 47 supported by a bracket 48 which is mounted in ways 49 lying parallel to the ways 39 in the base 25. The bracket 48 is positioned and locked by adjusting screws 50 threaded through the flanges 41. An annularly shaped base 51 is firmly sealed to the lower end of the bellows 46 and is threaded into the bottom, i. e. the normally open end, of the cup-shaped housing 47. The upper end of the bellows 46 is sealed by a cap 52. The space between the bellows 46 and the cup-shaped housing 47 is filled with hydraulic fluid and is connected by means of one of the tubes 22 to one of the capsules 16. The hydraulic pressure from the capsules thus applied externally tends to collapse the bellows 46 and thereby exerts force through a strut 53 whose pointed upper end rests in a cone-shaped depression in the underside of the cap 52. The lower end of the strut 53 is fitted with a bearing 54 which rests on a knife edge 55 of a knife edge block 56 carried in the lever 26 similarly to the force transmitting block 43. The bearing 54 is maintained in position on the knife edge 55 by an annular flexure plate 57 which surrounds the knife edge 55 and is welded or otherwise secured to the ends of the bearing surface of the bearing 54 and to points on the knife edge block 56 remote from the knife edge 55. The knife edge block 56 is adjusted and locked in position by adjusting screws 58 threaded through flanges in the lever 26. Two of these externally stressed bellows are used in the hydraulic scale illustrated in Figure I.

The results of numerous experiments, which were conducted to determine the errors in hydraulic scales, indicate that a substantial error is attributable to the receiving bellows.

This error, caused by deformation of the bellows under load, appears as a non-linear change in force transmission ratio during the loading from zero to full capacity. In the case of an internally stressed bellows the effect is a greater increase in transmission ratio during the first half of the load range than during the second half. Thus, if the overall ratio is adjusted so the indication is correct at zero load and full load it will be found "fast" at half load, i. e. indicating more load than is actually on the scale. The effect with an externally stressed bellows is approximately equal and reversed, i. e. the indication is "slow" at half capacity when the scale is adjusted to be correct at zero and full capacity. It is thus possible by using both types of bellows in one scale to cause the error of one type of bellows to compensate for the error of the other type.

In the scale shown in Figure I, two internally stressed and two externally stressed bellows are used, the two internally stressed bellows being connected to capsules at diagonally opposite corners of the load receiver, and the two externally stressed bellows being connected to the other two capsules. Therefore, the force created by a load on the load receiver which is symmetrically disposed with respect to the center lines of the platform will be transmitted partly by an internally and partly by an externally stressed bellows, and the over-all error of the scale will be the difference between the error of the internally stressed bellows and the error of the externally stressed bellows. If the two errors are equal, there is, of course, no net error in the indication.

However, if the loads on the platform are ordinarily not symmetrically placed with respect to the center lines, it is desirable that the compensation of error effected by a combination of internally and externally stressed bellows be complete for each corner of the platform. This is accomplished by connecting two bellows to each of the load supporting capsules and by arranging them to act in parallel (where each bellows acts independently on the gathering lever). In this arrangement the bellows of each pair are subjected to the same hydraulic pressure and by varying the point at which each of the bellows of each pair acts on the gathering lever their relative efforts may be varied to secure exact compensation of error. A receiving unit employing this modification is shown in plan in Figure VII and in side elevation in Figure VIII.

Hydraulic pressure from the capsules supporting the load receiver is transmitted through tubes 59 and branch pipes 60 and 61. The branch pipes 60 communicate with internally stressed bellows 62 whose upper ends are sealed to connector blocks 63 which in turn are clamped in brackets 64. The brackets 64 are adjustably mounted in a base structure 65. The lower ends of the bellows 62 are mounted on bellows bases 66 which are adjustably mounted in a gathering lever 67. This much of the structure is similar to the internally stressed bellows 23 previously described. Hydraulic pressure is also transmitted through the other branch pipes 61 to cup-shaped housings 68 which are constructed and mounted in the same manner as the cup-shaped housing 47 previously described. An externally stressed bellows is mounted in each of the cup-shaped housings 68 and by means of struts applies force to knife edges adjustably mounted in the gathering lever 67. While a small amount of adjustment was allowed in the mounting of the internally and externally stressed bellows 23 and 46, a much larger range of adjustment is provided when they are used in parallel with each pair connected to one capsule. In this arrangement the force acting on the gathering lever for a given pressure exerted by the capsule is proportional to the sum of the effective areas of the internally and externally stressed bellows. If the two bellows of each pair have exactly equal and opposite errors and are mounted to act on the lever 67 at the same effective pivot distance, the error in one will exactly balance the error in the other. If the errors are not exactly equal, that bellows having the greater error may be moved closer to the fulcrum to decrease the effect of that bellows on the lever, while the other bellows is moved away from the fulcrum to maintain the same average force transmission ratio. It is thus possible by moving one or the other or both of the bellows to obtain the desired force transmission ratio and at the same time compensate for the change in effective area of the bellows as the hydraulic pressure is applied.

The independent mounting of each of the bellows of each pair suffers from the disadvantage that whenever an adjustment is made to secure a more exact compensation, another adjustment must be made to restore the average force transmission ratio. This disadvantage may be overcome by mounting each pair of bellows in a subassembly which is adjustable as a whole to secure ratio adjustment and is rotatable to vary the effective fulcrum distance of each bellows to secure error compensation. Such a bellows mounting is shown in Figures IX and X. The subassembly comprises a circular bellows base 69 provided on its underside with a tenon 70 by means of which it is mounted in a retainer 71. The retainer 71 is adjustable in ways 72 located in a recessed portion of a gathering lever 73. The retainer 71 is locked in position by means of a pair of cone-pointed locking screws 74 threaded through walls 75 of the recess in the gathering lever 73. Adjustment of the retainer 71 in the ways 72 varies the distance from the bellows base 69 to the fulcrum of the lever 73. On the upper surface near one edge, the bellows base 69 is machined to form a seat 76 for an internally stressed bellows 77. An upwardly extending strut 78 is studded into the bellows base 69 at a point diametrically opposite the seat 76. The strut 78 extends upwardly into and engages a cap 79 which seals the upper end of an externally stressed bellows 80 which is mounted in a cup-shaped housing 81. The cup-shaped housing 81 is attached near the edge of the underside of a circular disk 82. An upper base 83 provided for the internally stressed bellows 77 is attached to the underside of the circular disk 82 at a point diametrically opposed to the attachment point of the cup-shaped housing 81. In this manner the internally stressed bellows 77 and the externally stressed bellows 80 are mounted parallelly between the bellows base 69 and the circular disk 82.

The circular disk 82 has an integrally formed tenon 84 extending upwardly from the center of its upper surface. An upper retaining member 85, through which the tenon 84 passes, is slidably mounted between horizontal arms 86 of a bracket 87 which is adjustably mounted in a base 88. The upper retaining member 85 is adjustable along the arms 86 to correspond with the adjustment of the lower retaining member 71 along the ways 72 of the lever 73 and is locked in position by a nut 89 threaded on to its upper end. The disk 82 is locked to the retaining member 85 by a nut 90 screwed onto the tenon 84. The tenon 84, the disk 82, the cup-shaped housing 81 and the upper base 83 of the bellows 77 are drilled to provide interconnecting ducts 91, 92 and 93, by which hydraulic pressure may be transmitted through the tenon 84 to the bellows 77 and 80. The capsule associated with the receiver is connected by means of a pipe 94 terminating a union 95 which is screwed into the upper end of the tenon 84.

In this arrangement, the force transmitted to the lever 73 by a given hydraulic pressure from the capsule may be varied by adjusting the retainer 71 in the lever 73 and the upper retainer 85 between the arms 86 of the bracket 87. The relative effect of the internally and externally stressed bellows may be adjusted without affecting the force transmission ratio by rotating the bellows base 69 and the disk 82. For this to be true it is of course necessary that the internally stressed bellows 77 and the externally stressed bellows 80 be disposed at exactly equal distances either side the axis of rotation of the bellows base 69 and disk 82.

It should be noted that in each illustration, both ends of each bellows mounting may be removed from the adjacent structure without disconnecting any of the piping. This is a desirable feature in that it allows each capsule with its associated bellows and interconnecting tubes to be evacuated and filled with the proper amount of hydraulic fluid at the factory prior to shipping and installation. It also allows the substitution of a new assembly of bellows and capsule for any such assembly which may be damaged or otherwise rendered unfit for service without encountering the difficulties inherent in the filling of a sensitive hydraulic system in the field.

These features of the combination of internally and externally stressed bellows units with the possibilities of factory filling when combined with the load supporting capsules which are available, allows the construction of hydraulic scales having the same accuracy as competing lever scales without the cost and space requirements of the heavy levers.

Having described the invention, I claim:

1. In a weighing scale incorporating hydraulic force transmission elements, in combination, a plurality of capsules supporting a load receiver, the capsules being adapted to transform mechanical force into hydraulic pressure, a plurality of bellows, one for each capsule, adapted to transform hydraulic pressure into mechanical force, means for hydraulically connecting each capsule to its corresponding bellows, means for combining, counterbalancing, and indicating the mechanical force exerted by the bellows, some of said bellows being adapted to receive hydraulic pressure internally, the remainder of said bellows being enclosed in chambers and adapted to receive hydraulic pressure externally, the capsules connected to the bellows receiving hydraulic pressure internally being arranged symmetrically with respect to the capsules connected to the other bellows, whereby loads supported by the capsules in combination will be correctly indicated.

2. In a weighing scale incorporating hydraulic force transmission elements, in combination, a plurality of capsules supporting a load receiver and adapted to transform mechanical force into hydraulic pressure, a plurality of bellows one for each capsule adapted to transform hydraulic pressure into mechanical force, means for hydraulically connecting corresponding capsules and bellows, means for combining, counterbalancing and indicating the forces exerted by the bellows, some of said bellows being adapted to receive the hydraulic pressure internally, others of said bellows being confined in chambers and adapted to receive hydraulic pressure externally, said capsules connected to bellows receiving hydraulic pressure internally being paired with capsules connected to bellows receiving hydraulic pressure externally so that the load supported by each pair of capsules in combination is correctly indicated with the error of one bellows compensating for the error of the other bellows.

3. In a weighing scale incorporating hydraulic force transmission elements, in combination, a hydraulic force transmitting system comprising load supporting hydraulic capsules and counterbalance actuating bellows in which some of the bellows are arranged to receive hydraulic pressure internally and the remaining bellows are arranged to receive hydraulic pressure externally in order that the errors inherent in one type of bellows may be compensated by the errors inherent in the other type of bellows.

4. A hydraulic force transmitting system for use in a weighing scale comprising a load supporting capsule, a pair of bellows connected to act in parallel, and a bendable pipe connecting the capsule to the bellows, one of the bellows being adapted to receive hydraulic fluid internally, the other being enclosed in a cup with the hydraulic fluid in the space between the cup and the bellows, said system being adaptable to be assembled and filled with fluid prior to installation.

5. A hydraulic force transmitting system for use in a weighing scale comprising a load supporting hydraulic pressure transmitter, a pair of bellows connected to act in parallel, and a bendable pipe connecting the hydraulic pressure transmitter to the bellows, one of the bellows being adapted to receive hydraulic fluid internally, the other being enclosed in a cup with the hydraulic fluid in the space between the cup and the bellows, said system being adaptable to be assembled and filled with fluid prior to installation.

6. In a weighing scale incorporating hydraulic force transmitting elements, in combination, a plurality of hydraulic capsules supporting a load receiver, a plurality of bellows hydraulically connected to the capsules and adapted to actuate load counterbalancing means, there being two bellows connected to each capsule and acting independently on the load counterbalancing means, wherein one of the two bellows connected to each capsule is adapted to receive hydraulic fluid internally, the other being enclosed in a cup-shaped housing and adapted to receive hydraulic fluid between the housing and bellows, said bellows being individually adjustable on the counterbalancing means whereby their relative and combined effect on the counterbalancing means may be varied.

7. A hydraulic pressure receiving unit adapted to transform hydraulic pressure into mechanical force comprising a pair of bellows connected in parallel to a hydraulic pressure source, rotatably and transversely adjustable support members between whose opposed faces said pair of bellows is mounted, said pair of bellows including one bellows which receives hydraulic pressure internally and one bellows which is enclosed in a chamber and receives hydraulic pressure externally.

8. A hydraulic pressure receiving unit adapted to transform hydraulic pressure into mechanical force comprising a pair of bellows connected in parallel to a source of hydraulic pressure, a pair of support members mounted for rotative and transverse adjustment in a base and lever, said bellows being mounted between opposed faces of said members at equal distances from the axis of rotative adjustment, one of said bellows being adapted to receive hydraulic pressure internally, and the other adapted to receive hydraulic pressure between itself and a surrounding cup, said rotative adjustment allowing the relative effects of said bellows to be varied and the transverse adjustment allowing their combined effect on the lever to be varied.

LAWRENCE S. WILLIAMS.